United States Patent
Yokota

(10) Patent No.: US 8,082,898 B2
(45) Date of Patent: Dec. 27, 2011

(54) RESONATOR

(75) Inventor: Yoshihito Yokota, Isesaki (JP)

(73) Assignee: Mahle Filter Systems Japan Corporation, Tokyo (JP)

( * ) Notice: Subject to any disclaimer, the term of this patent is extended or adjusted under 35 U.S.C. 154(b) by 821 days.

(21) Appl. No.: 12/137,719

(22) Filed: Jun. 12, 2008

(65) Prior Publication Data

US 2008/0308061 A1 Dec. 18, 2008

(30) Foreign Application Priority Data

Jun. 14, 2007 (JP) .................................. 2007-157003

(51) Int. Cl.
*F02M 35/10* (2006.01)
(52) U.S. Cl. .................................................. 123/184.57
(58) Field of Classification Search .............. 123/184.57
See application file for complete search history.

(56) References Cited

U.S. PATENT DOCUMENTS 6,705,267 B1 * 3/2004 Westerbeke et al. ..... 123/184.57
2002/0195076 A1 * 12/2002 Nomizo et al. .......... 123/184.57
2008/0236534 A1 * 10/2008 Mayer et al. ............. 123/184.57
2009/0236172 A1 * 9/2009 Ross et al. ............... 123/184.57

FOREIGN PATENT DOCUMENTS

| JP | 8-338330 A | 12/1996 |
| JP | 11-294278 A | 10/1999 |

* cited by examiner

*Primary Examiner* — Stephen K Cronin
*Assistant Examiner* — Arnold Castro
(74) *Attorney, Agent, or Firm* — Foley & Lardner LLP

(57) ABSTRACT

A resonator is provided with a neck portion and a resonator main body. The resonator main body includes a main volume chamber communicated with an air intake duct of an internal combustion engine for a vehicle via the neck portion, and at least one sub-volume chamber directly connected to the main volume chamber. The resonator main body is configured to have both a Helmholtz-resonator functional part whose resonance frequency is determined based on a total volumetric capacity of the resonator main body, substantially corresponding to a summed value of a volume of the main volume chamber and a volume of the sub-volume chamber, and a side-branch-resonator functional part whose resonance frequency is determined based on a longitudinal length of the sub-volume chamber.

8 Claims, 8 Drawing Sheets

INTAKE-AIR
FLOW DIRECTION

RESONATOR

TECHNICAL FIELD

The present invention relates to a resonator, and specifically to a combined resonator (or a combined noise-suppressor) installed on an air intake duct for internal combustion engines and having a plurality of silencing functions or a plurality of resonance frequencies.

BACKGROUND ART

In recent years, there have been proposed and developed various combined resonators, each of which is configured to provide different resonance frequencies. One such combined resonator has been disclosed in Japanese Patent Provisional Publication No. 8-338330 (hereinafter is referred to as "JP8-338330"). In the combined-resonator equipped air intake duct disclosed in JP8-338330, a plurality of resonators are combined and connected in series to each other. The combined resonator can provide the same number of resonance frequencies as the number of the resonators connected to each other. In more detail, in the combined-resonator equipped air intake duct disclosed in JP8-338330, a first one of the plurality of resonators is communicated with the air intake duct through a first insertion conduit, whereas the second resonator is communicated with the first resonator through a second insertion conduit.

SUMMARY OF THE INVENTION

However, in order to increase the number of resonance frequencies, the combined resonator configuration as disclosed in JP8-338330 requires an increase in the number of resonators connected in series to each other and an increase in the number of insertion conduits. This leads to the problem of a more complicated resonator design. Additionally, in the case of the combined resonator configuration as disclosed in JP8-338330, there is a possibility of increased manufacturing costs, in comparison with a case that a plurality of resonators having different resonance frequencies are mounted on the air intake duct independently of each other.

It is, therefore, in view of the previously-described disadvantages of the prior art, an object of the invention to provide a compactly-designed combined resonator capable of providing at least two resonance frequencies without complicated resonator configuration.

In order to accomplish the aforementioned and other objects of the present invention, a resonator comprises a neck portion, and a resonator main body comprising a main volume chamber communicated with an air intake duct of an internal combustion engine for a vehicle via the neck portion, and at least one sub-volume chamber directly connected to the main volume chamber, wherein the resonator main body is configured to have both a Helmholtz-resonator functional part whose resonance frequency is determined based on a total volumetric capacity of the resonator main body, substantially corresponding to a summed value of a volume of the main volume chamber and a volume of the sub-volume chamber, and a side-branch-resonator functional part whose resonance frequency is determined based on a longitudinal length of the sub-volume chamber.

The other objects and features of this invention will become understood from the following description with reference to the accompanying drawings.

DESCRIPTION OF THE PREFERRED EMBODIMENTS

Figure 1:
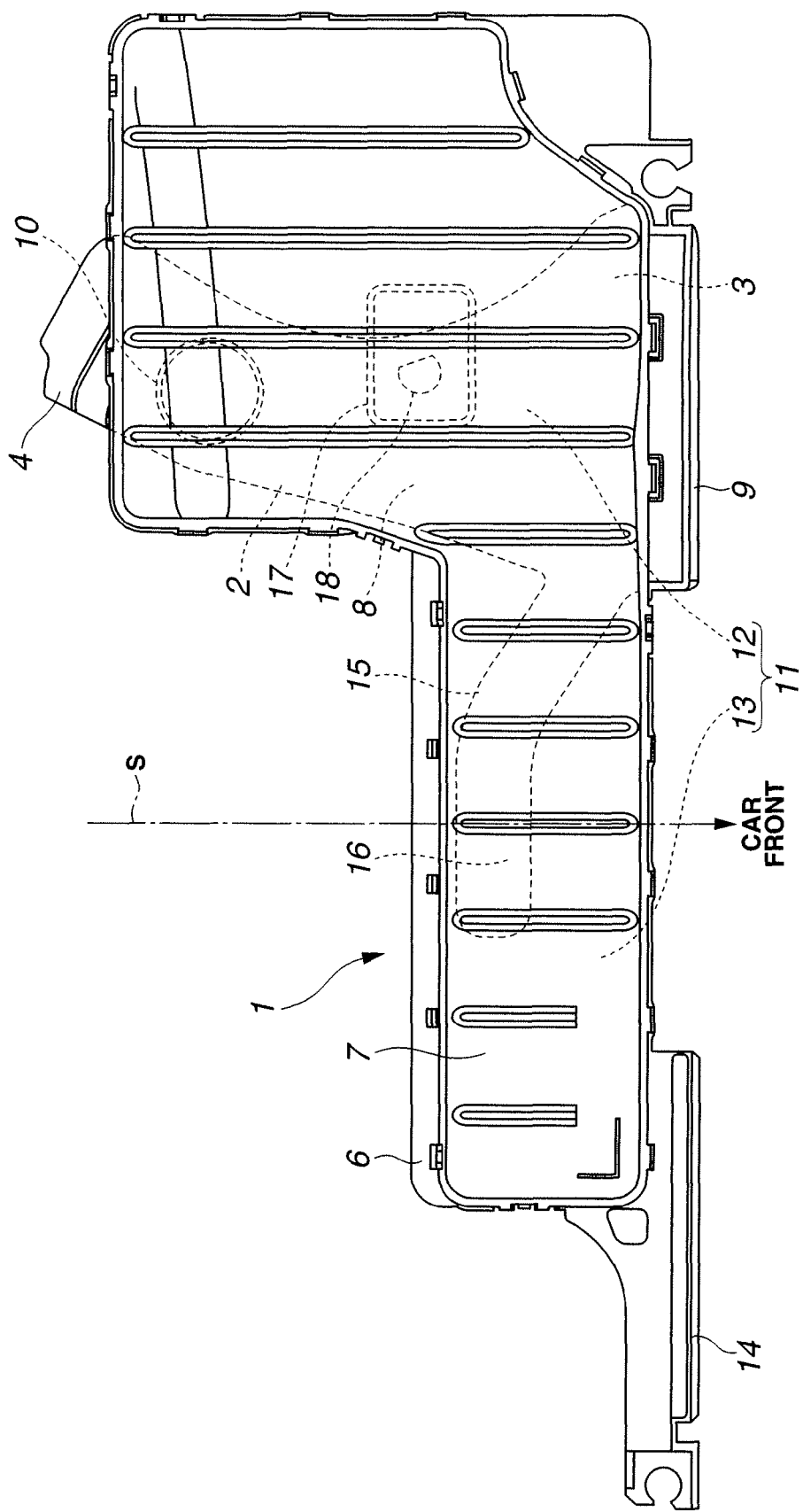
FIG. 1 is a plan view illustrating an embodiment of a resonator, which is applied to an intake system of an internal combustion engine.
Figure 2:
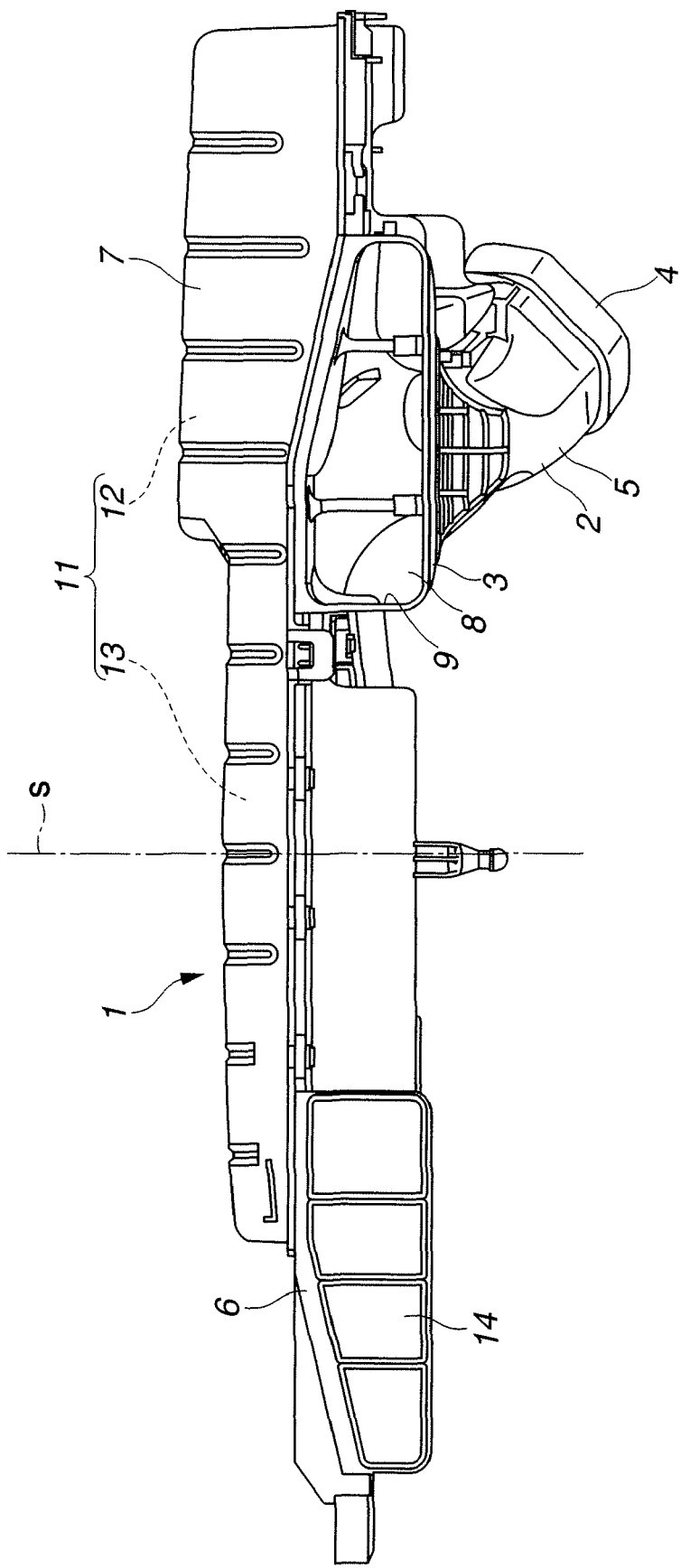
FIG. 2 is a front elevation illustrating the resonator of the embodiment shown in FIG. 1.
Figure 3:
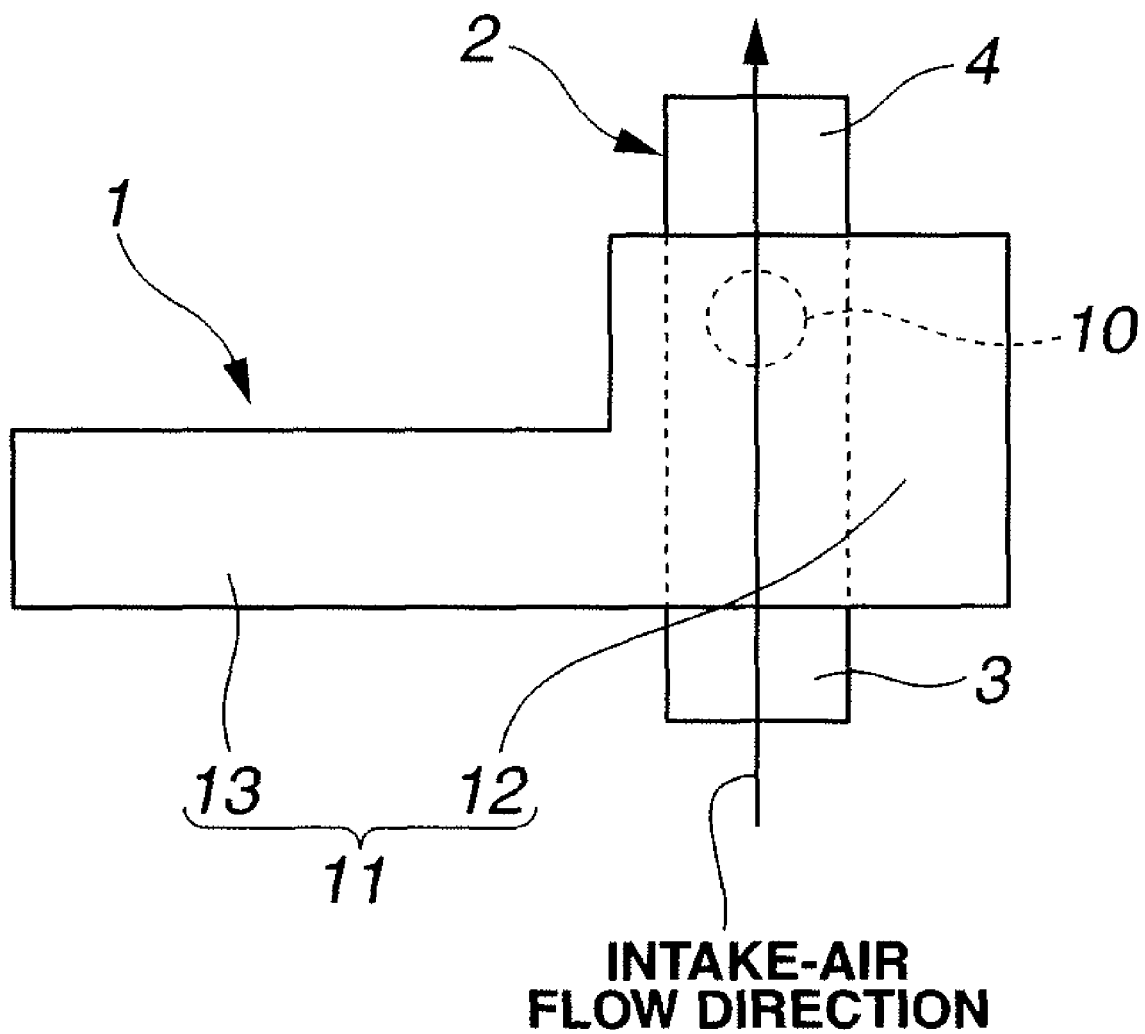
FIG. 3 is a schematic view illustrating the resonator of the embodiment.

Referring now to the drawings, particularly to FIGS. 1-3, a resonator 1 of the embodiment is exemplified in a noise suppressor of an air intake system of an internal combustion engine for an automotive vehicle. As seen in FIGS. 1-3, resonator 1, which is made of synthetic resin, is formed as a substantially L-shaped flat resonator. Resonator 1 is located above an air intake duct 2, which duct is also made of synthetic resin. Resonator 1 is connected to air intake duct 2 via a neck portion 10 (described later). Air intake duct 2 has a substantially cylindrical-hollow shape. Air intake duct 2 is laid out within an engine room of the automotive vehicle, such that one end 3 of air intake duct 2 faces the front end face of the vehicle. On the other hand, the other end 4 of air intake duct 2 is connected to an air cleaner (not shown) via another duct (not shown).

As shown in FIGS. 1-2, and FIGS. 4-6, in the shown embodiment, air intake duct 2 is mainly constructed by a first main body 5 (regarded substantially as a lower half of intake duct 2) and a second main body 6 (regarded substantially as an upper half of intake duct 2). First and second main bodies 5 and 6 are connected to or fitted to each other by means of a snap-fit mechanism. In a similar manner, resonator 1 is mainly constructed by second main body 6 and a resonator cover 7. Second main body 6 and resonator cover 7 are connected to or fitted to each other by means of a snap-fit mechanism. When assembling, first of all, second main body 6 is snap-fitted onto first main body 5, and then resonator cover 7 is snap-fitted onto second main body 6. In other words, after assembling, second main body 6 is sandwiched between first main body 5 and resonator cover 7. The detailed structure of first main body 5 is hereunder described.

Figure 4:
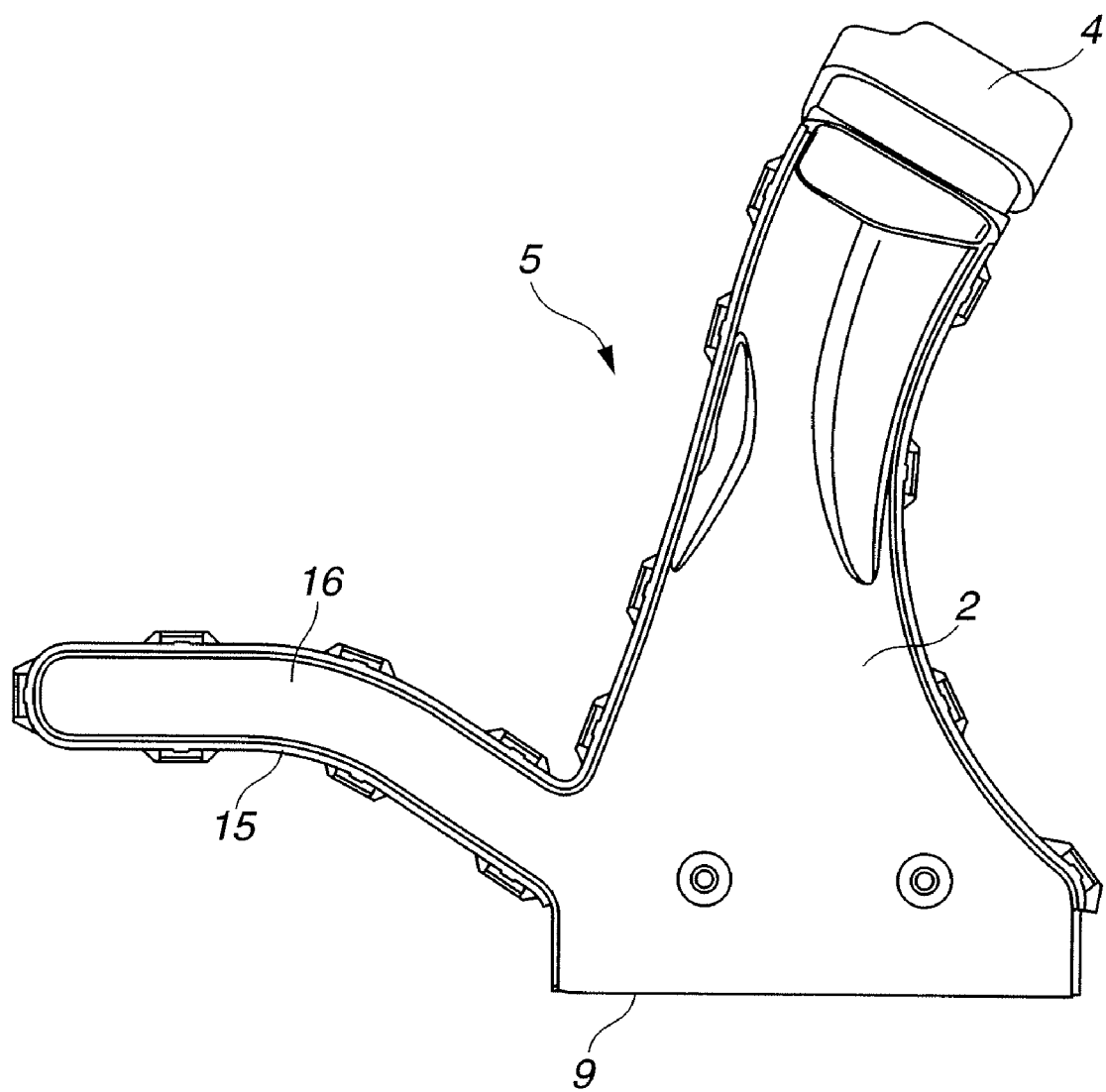
FIG. 4 is a plan view illustrating a first main body constructing a part of the induction system.

First main body 5 is formed integral with the other end 4 of air intake duct 2 in a manner so as to contain the other intake-duct end 4 (see FIG. 4). In more detail, air intake duct 2 is formed as a substantially horizontally-split structure that air intake duct 2 is split into two halves, namely, upper and lower halves, horizontally split substantially along the centerline of an air intake passage 8 (see FIGS. 1-2) defined in air intake duct 2. That is, the lower half of air intake duct 2 is defined or constructed by first main body 5. However, note that the two opposing split faces upwardly incline at the other end 4 of air intake duct 2, and thus the other end portion 4 is integrally formed with first main body 5. In contrast, one end 3 of air intake duct 2 is completely horizontally split into two halves. Thus, an air intake 9 (described later) is also horizontally split into two halves, that is, a lower half included in the first main body 5 and an upper half included in the second main body 6. The detailed structure of second main body 6, which serves as an intermediate component part sandwiched between first main body 5 and resonator cover 7, is hereunder described.

The underside of second main body 6 (viewing FIG. 2) defines the upper half of air intake duct 2. As previously described, resonator 1 of the embodiment has a horizontally-split structure composed of resonator cover 7 (the upper half) and second main body 6 (the lower half). That is, the lower half of resonator 1 of the two-split structure is defined by the upside of second main body 6 (viewing FIG. 2). The detailed structure of resonator cover 7 is hereunder described.

Resonator cover 7 (i.e., the upper half of resonator 1) is configured or contoured to cover the lower half of resonator 1, defined in the upside of second main body 6.

Air intake duct 2 is integrally formed at one end 3 with air intake 9, which air intake opens at the front end of the vehicle in such a manner as to be directed forwardly of the vehicle. Additionally, the passage cross-sectional area of air intake duct 2 is configured or dimensioned to gradually enlarge from the other end 4 to one end 3 (or air intake 9) (see FIGS. 1 and 4-5). As indicated by the broken line in FIG. 1, air intake duct 2 is formed into a substantially funnel shape. Additionally, air intake 9 of air intake duct 2 is arranged to be laterally offset rightwards (viewing FIGS. 1-2) from the central position (indicated by a reference line S in FIGS. 1-2). More concretely, air intake duct 2 is laid out in the engine room, in a manner so as to be offset rightwards from the reference line S that indicates the central position in the lateral direction of the vehicle, i.e., in the direction of the y-axis of the vehicle axis system (x, y, z), as viewed from the front end face of the vehicle.

Figure 5:
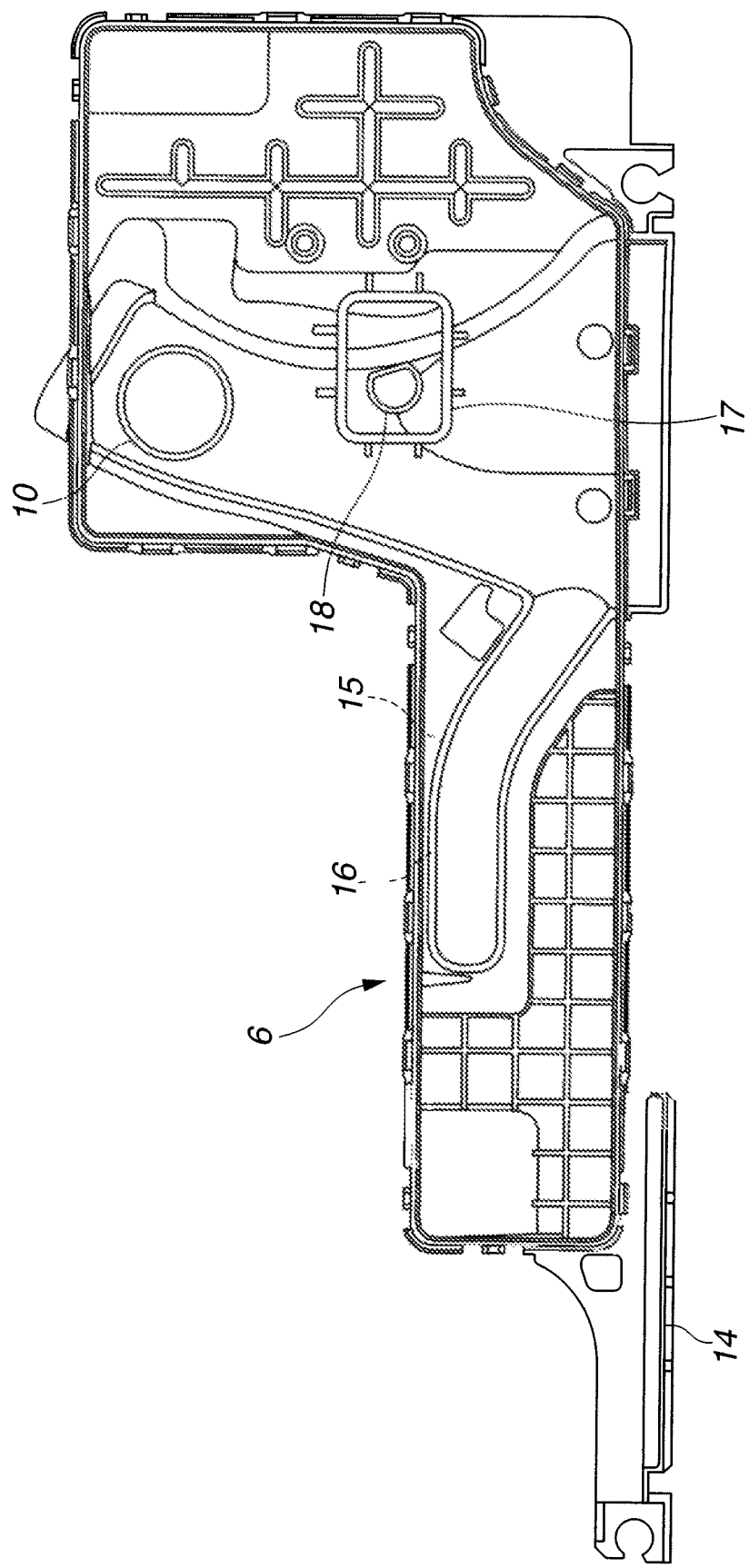
FIG. 5 is a plan view illustrating a second main body constructing a part (a lower half) of the resonator of the embodiment.

Briefly speaking, as appreciated from the schematic view of FIG. 3, resonator 1 of the embodiment includes a cylindrical-hollow neck portion 10 and a resonator main body 11. Resonator main body 11 is comprised of (i) a main volume chamber 12 communicated with air intake duct 2 via neck portion 10, and (ii) an elongated sub-volume chamber 13 connected directly to main volume chamber 12. As best seen in FIG. 5, neck portion 10 is integrally formed with or integrally connected to second main body 6. As best seen in FIGS. 1-2 and FIGS. 5-6, resonator main body 11 is comprised of second main body 6 and resonator cover 7. As seen from the front elevation of FIG. 2, each of main volume chamber 12 and sub-volume chamber 13 is formed as a substantially rectangular flat chamber. The volume of the internal space defined in main volume chamber 12 is dimensioned to be greater than that of sub-volume chamber 13. As seen from the plan view of FIG. 1, main volume chamber 12 is formed into a substantially square, whereas sub-volume chamber 13 is formed into an elongated rectangle.

With the resonator 1 installed on the vehicle, main volume chamber 12 and sub-volume chamber 13 are configured and connected to each other in a manner so as to ensure the properly reduced vertical thickness of resonator main body 11 in the direction of the z-axis of the vehicle axis system (x, y, z). That is, under an assembled condition where resonator main body 11 has been installed on the vehicle, resonator main body 11 is configured and formed into a laterally-elongated and vertically-flattened shape as viewed from the elevation shown in FIG. 2, and also formed into a substantially L-shape as viewed from the plan view shown in FIG. 1.

Figure 6:
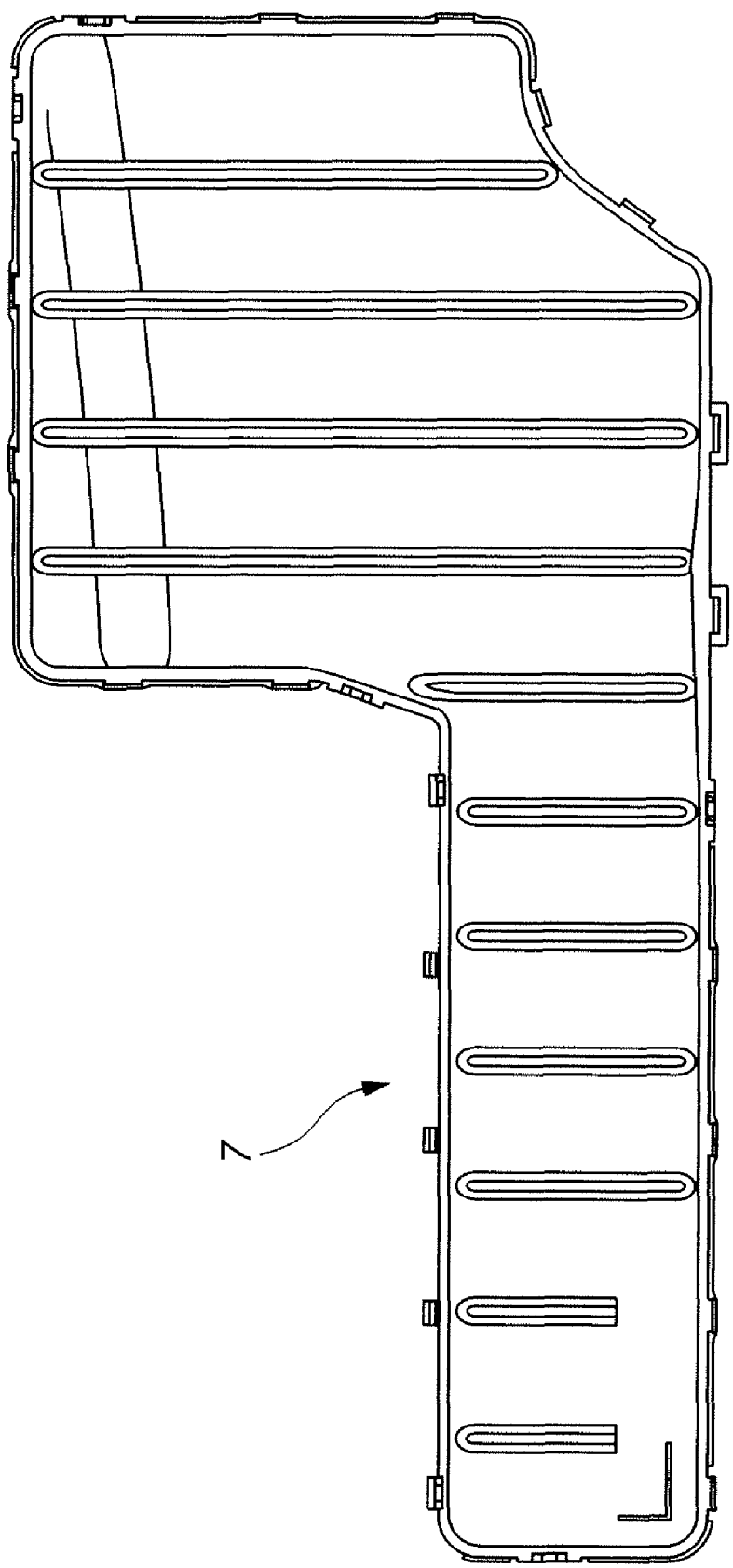
FIG. 6 is a plan view illustrating a resonator cover constructing a part (an upper half) of the resonator of the embodiment.

Resonator 1 is configured or laid out in the engine room and arranged in close proximity to air intake 9 of air intake duct 2, so that main volume chamber 12 is located above air intake duct 2, and that the longitudinal direction of sub-volume chamber 13 is identical to the lateral direction (the direction of the y-axis) of the vehicle, and that sub-volume chamber 13 is arranged along the front end face of the vehicle in a manner so as to laterally extend across the reference line S (substantially corresponding to the centerline of the vehicle). In addition to the above, a dummy air intake 14 is further provided at or attached to the left-hand end of sub-volume chamber 13, so that air intake 9 and dummy air intake 14 are symmetrical each other with respect to the reference line S. As best seen in FIG. 6, dummy air intake 14 is formed integral with second main body 6. As seen from the elevation view of FIG. 2, dummy air intake 14 is formed into a substantially same outline as air intake 9, as viewed from the front end face of the vehicle. Dummy air intake 14 is not communicated with sub-volume chamber 13. That is, dummy air intake 14 never functions as an actual air intake.

Additionally, as best seen in FIGS. 1, and 4-5, a so-called side-branch resonator (a second resonator or an additional side-branch resonator) 15 is connected to one end 3 of air intake duct 2, in a manner so as to extend leftwards (viewing FIG. 1) from one intake-duct end 3 in a substantially lateral direction of the vehicle. Second resonator 15 is formed integral with sub-volume chamber 13 (that is, resonator main body 11) in a manner so as to extend along the lower face of sub-volume chamber 13. More concretely, second resonator 15 is formed as a horizontally-split structure that second resonator 15 is split into two halves, namely, upper and lower halves, horizontally split substantially along the centerline of an internal passage 16 (see FIGS. 1, and 4-5) defined in second resonator 15. The lower half of second resonator 15 is defined by first main body 5, whereas the upper half of second resonator 15 is defined on the underside of second main body 6.

A device denoted by reference sign 17 in FIGS. 1 and 5, is a so-called Helmholtz resonator (a third resonator) formed in main volume chamber 12. Notice that the Helmholtz resonator (the third resonator) 17 is an additional resonator separated from resonator 1. The Helmholtz resonator (the third resonator) 17 is connected to air intake duct 2 via a neck portion 18.

Figure 7:
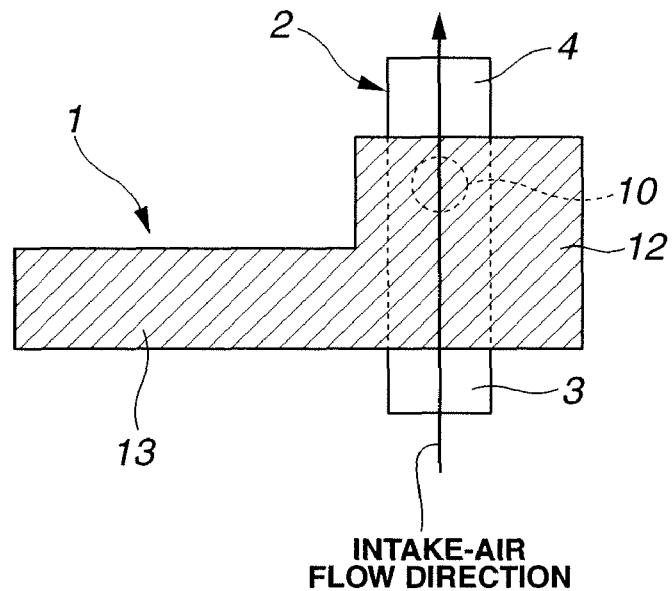
FIG. 7 is an explanatory view illustrating a first resonator function (a Helmholtz resonator function) carried out by the resonator of the embodiment.
Figure 8:
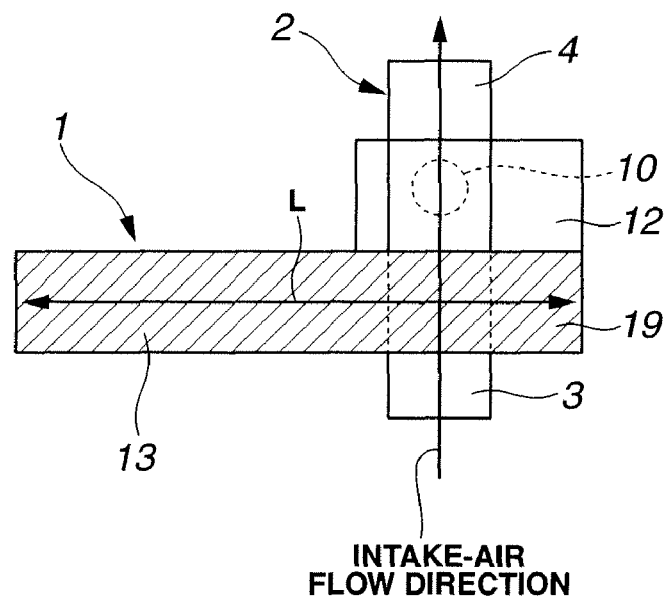
FIG. 8 is an explanatory view illustrating a second resonator function (a side-branch resonator function) carried out by the resonator of the embodiment.

With the previously-noted arrangement, as appreciated from FIGS. 7-8, resonator 1 (in particular, resonator main body 11) of the embodiment has both (i) a Helmholtz-resonator functional part of and (ii) a side-branch-resonator functional part. The Helmholtz-resonator functional part (see the right-hand diagonal shading area in FIG. 7) of resonator 1, which fulfills a function of the Helmholtz resonator, is constructed by neck portion 10 and a combined volume chamber of main volume chamber 12 and sub-volume chamber 13. On the other hand, the side-branch-resonator functional part (see the right-hand diagonal shading area in FIG. 8) of resonator 1, which fulfills a function of the side-branch resonator, is constructed by sub-volume chamber 13 and a hypothetical extension 19 of sub-volume chamber 13, which extension is obtained by hypothetically fully extending sub-volume chamber 13 into main volume chamber 12 in the longitudinal direction of sub-volume chamber 13. Thus, the resonance frequency of the Helmholtz-resonator functional part of resonator 1 is determined based on the summed value of the volume of main volume chamber 12 and the volume of sub-volume chamber 13, the cross-sectional area of the internal passage defined in the cylindrical-hollow neck portion 10, and the axial length of neck portion 10, measured in the direction of the axis of the cylindrical-hollow neck portion 10. On the other hand, the resonance frequency of the side-branch-resonator functional part of resonator 1 is determined based on the summed value L of the length of sub-volume chamber 13 and the length of hypothetical extension 19, both measured in the longitudinal direction of sub-volume chamber 13. As seen in FIG. 8, hypothetical extension 19 is actually included in main volume chamber 12.

Figure 9:
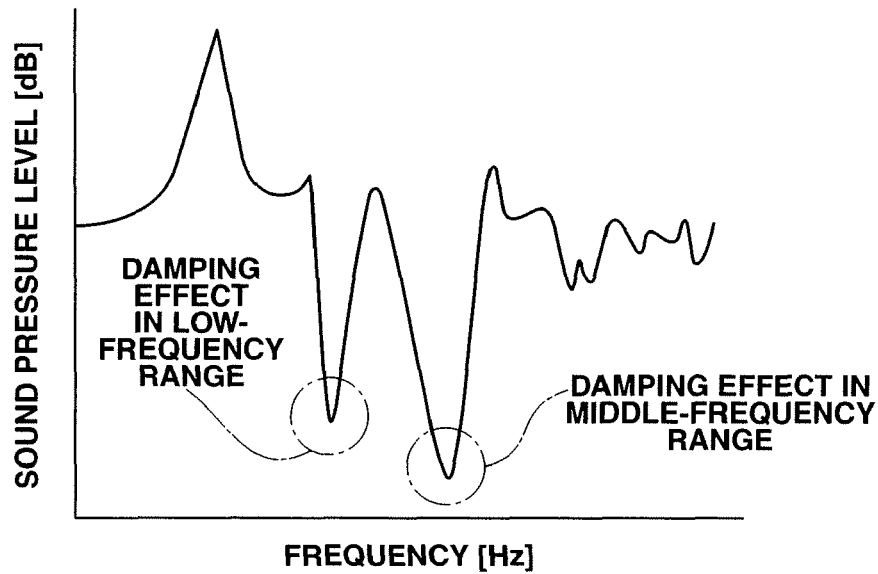
FIG. 9 is a characteristic diagram showing a frequency characteristic, obtained by the resonator of the embodiment.

As discussed above, resonator 1 of the embodiment has both (i) the Helmholtz-resonator functional part (see the right-hand diagonal shading area in FIG. 7) and (ii) the side-branch-resonator functional part (see the right-hand diagonal shading area in FIG. 8). Therefore, as can be seen from the noise-suppression frequency characteristic diagram of FIG. 9, it is possible to produce a remarkable damping effect in a low-frequency range by the Helmholtz-resonator functional part of resonator 1, and simultaneously to produce a remarkable damping effect in a middle-frequency range by the side-branch-resonator functional part of resonator 1. That is to say, by the use of the simply- and compactly-designed resonator 1 having both the Helmholtz-resonator functional part and the side-branch-resonator functional part, it is possible to certainly obtain two different resonance frequencies, without complicated resonator configuration concerning resonator main body 11. This contributes to reduced manufacturing costs of resonator 1.

In the shown embodiment, main volume chamber 12, sub-volume chamber 13, and neck portion 10 are configured and dimensioned, so that the resonance frequency, obtained by the Helmholtz-resonator functional part of resonator 1, produces a damping effect in a low-frequency range of 100 Hz or less, and that the resonance frequency, obtained by the side-branch-resonator functional part of resonator 1, produces a damping effect in a middle-frequency range of 250 Hz or more.

Additionally, as previously described, according to the combined resonator structure of the embodiment, sub-volume chamber 13 serves as an element common to both the Helmholtz-resonator functional part and the side-branch-resonator functional part. Thus, as compared to a case that two different resonance frequencies are obtained by a Helmholtz resonator and a side-branch resonator separated from each other and mounted on a common air intake duct independently of each other, the simply- and compactly-designed resonator 1 of the embodiment having both the Helmholtz-resonator functional part and the side-branch-resonator functional part ensures a totally downsized resonator configuration. That is to say, in the case of resonator 1 of the embodiment, a portion of the volume chamber of the Helmholtz-resonator functional part (main volume chamber 12 plus sub-volume chamber 13) also serves as the side-branch-resonator functional part (sub-volume chamber 13 plus hypothetical extension 19). Usually, a Helmholtz-type resonator itself requires a comparatively large volumetric capacity so as to produce a desired damping effect in a low-frequency range. In contrast, in the case of the simply- and compactly-designed resonator 1 of the embodiment having the Helmholtz-resonator functional part whose portion can also serve as the side-branch-resonator functional part, in spite of the comparatively small space that the Helmholtz-resonator functional part (main volume chamber 12 plus sub-volume chamber 13) and the side-branch-resonator functional part (sub-volume chamber 13 plus hypothetical extension 19) occupy, in other words, the comparatively small total volumetric capacity of resonator 1, it is possible to certainly efficiently produce two different resonance frequencies.

Additionally, dummy air intake 14 is provided at or attached to sub-volume chamber 13. Dummy air intake 14 serves as a reinforcement for sub-volume chamber 13. Therefore, it is possible to enhance the rigidity (the structural strength) of sub-volume chamber 13 itself, in particular, the rigidity of a portion of sub-volume chamber 13 at which dummy air intake 14 is provided. Furthermore, dummy air intake 14, which never functions as an actual air intake, and air intake 9, which functions as an actual air intake, are arranged symmetrically each other with respect to the reference line S (substantially corresponding to the centerline of the vehicle). As a result of the provision of dummy air intake 14 as well as air intake 9, the appearance of the front face of the vehicle becomes symmetrical with respect to the centerline of the vehicle. The symmetric layout of the air-intake pair (9, 14) has good look in the appearance.

Also, in the shown embodiment, the additional side-branch resonator (the second resonator) 15 is formed integral with sub-volume chamber 13 (in other words, resonator main body 11) in such a manner as to extend along the lower face of sub-volume chamber 13. Thus, second resonator 15 (the additional side-branch resonator) can be formed as a horizontally-split structure that second resonator 15 is split into upper and lower halves, horizontally split substantially along the centerline of internal passage 16 (see FIGS. 4-5) defined in second resonator 15, so that the lower half of second resonator 15 is defined by first main body 5, and that the upper half of second resonator 15 is defined on the underside of second main body 6. That is, a portion of the wall surface of resonator main body 11 also serves or shares as a portion of the wall surface of second resonator 15. This contributes to lightweight and reduced manufacturing costs.

Regarding resonator 1 of the embodiment discussed in reference to FIGS. 1-9, resonator main body 11 is comprised of (i) only one main volume chamber 12 communicated with air intake duct 2 via neck portion 10, and (ii) only one sub-volume chamber 13 connected directly to main volume chamber 12. In lieu thereof, for one main volume chamber, there may be provided a plurality of elongated sub-volume chambers, each of which is directly connected to the main volume chamber. In such a case, as hereunder described in detail in reference to the schematic view of a modified resonator 31 illustrated in FIG. 10, it is possible to fulfill a function of a plurality of side-branch resonators as well as a function of one Helmholtz resonator. In other words, in spite of a single combined resonator system comprised of one main volume chamber and a plurality of elongated sub-volume chambers, each of which is directly connected to the main volume chamber, it is possible to certainly obtain two or more different resonance frequencies.

Figure 10:
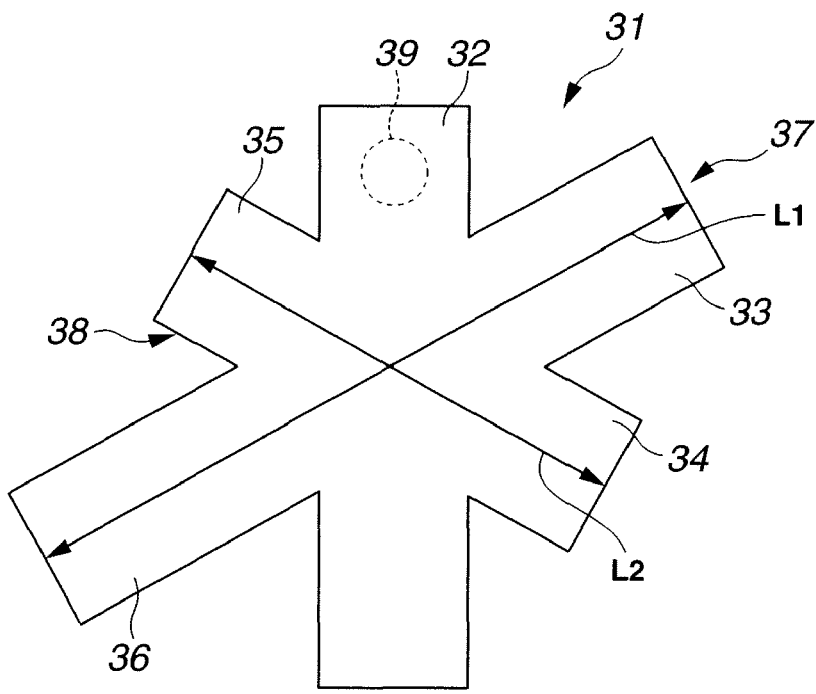
FIG. 10 is a schematic view illustrating a modified resonator.

Referring now to FIG. 10, there is shown the modified resonator 31. Modified resonator 31 is comprised of a main volume chamber 32 and four sub-volume chambers 33, 34, 35, and 36, each of which is directly connected to main volume chamber 32 and has the same lateral cross section. In the case of resonator 31 of the modification shown in FIG. 10, the number of sub-volume chambers 33-36 is an even number, and the four sub-volume chambers 33-36 are classified into two pairs, namely, (i) the first pair of sub-volume chambers, comprised of two sub-volume chambers 33 and 36 whose central axes are identical to each other, and (ii) the second pair of sub-volume chambers, comprised of two sub-volume chambers 34 and 35 whose central axes are identical to each other. Therefore, as can be seen from the schematic view of FIG. 10, the first pair of sub-volume chambers (33, 36) constructs a first side-branch resonator 37 having a longitudinal length L1, whereas the second pair of sub-volume chambers (34, 35) constructs a second side-branch resonator 38 having a longitudinal length L2. In FIG. 10, a member denoted by reference sign 39 is a cylindrical-hollow neck portion via which main volume chamber 32 is communicated with an air intake duct (not shown). As seen from the schematic view of FIG. 10, in the modified resonator 31, the longitudinal length L1 of the first side-branch resonator 37 (comprised of sub-volume chambers 33 and 36) is dimensioned to be longer than the longitudinal length L2 of the second side-branch resonator 38 (comprised of sub-volume chambers 34 and 35), and thus the resonance frequencies of the first and second side-branch resonators 37-38 differ from each other.

That is to say, as appreciated from FIG. 10, resonator 31 of the modification has (i) a Helmholtz-resonator functional part, (ii) the first side-branch-resonator functional part 37, and (iii) the second side-branch-resonator functional part 38. The above-mentioned Helmholtz-resonator functional part defined in modified resonator 31 is constructed by neck portion 39 and a combined volume chamber of main volume chamber 32 and sub-volume chambers 33 through 36. Therefore, by means of the modified resonator 31 of FIG. 10, it is possible to certainly obtain three different resonance frequencies, produced by the Helmholtz-resonator functional part and the first and second side-branch-resonator functional parts.

In a specific example of the previously-noted modified resonator 31 that the longitudinal lengths L1-L2 of the first and second side-branch-resonator functional parts 37-38 are identical to each other and thus the resonance frequencies of the first and second side-branch-resonator functional parts 37-38 become identical to each other, the number of different resonance frequencies, obtained by the modified resonator 31, becomes two.

As a further modification, suppose that central axes of four sub-volume chambers, each of which is directly connected to main volume chamber 32, are remarkably offset from each other. Additionally, suppose that longitudinal lengths of these side-branch-resonator functional parts, which functional parts are constructed by the respective sub-volume chambers and their hypothetical extensions obtained by hypothetically fully extending each of the sub-volume chambers into main volume chamber 32, differ from each other. The further modified resonator can realize five different resonance frequencies. In such a further modification, it will be understood that the number of the sub-volume chambers is not limited to an even number. That is, the further modification may be applied to a combined resonator comprised of a main volume chamber and a plurality of sub-volume chambers, which are directly connected to the main volume chamber and whose number is an odd number, for example, 3, 5, 7, 9, or 11.

As a still further modification, the still further modified resonator is comprised of a main volume chamber and a plurality of sub-volume chambers, each of which is directly connected to the main volume chamber and has the same lateral cross section. Regarding the plurality of sub-volume chambers, the still further modified resonator may be configured to include at least one pair of sub-volume chambers whose central axes are identical to each other and the other sub-volume chambers whose central axes are remarkably offset from each other. More concretely, in order to certainly obtain three or more different resonance frequencies, at least one pair of sub-volume chambers whose central axes are identical to each other, may be suitably combined with at least one offset sub-volume chamber whose central axis is remarkably offset from a central axis of the other sub-volume chamber.

The entire contents of Japanese Patent Application No. 2007-157003 (filed Jun. 14, 2007) are incorporated herein by reference.

While the foregoing is a description of the preferred embodiments carried out the invention, it will be understood that the invention is not limited to the particular embodiments shown and described herein, but that various changes and modifications may be made without departing from the scope or spirit of this invention as defined by the following claims.

What is claimed is:

1. A resonator comprising:
a neck portion; and
a resonator main body comprising:
    (a) a main volume chamber communicated with an air intake duct of an internal combustion engine for a vehicle via the neck portion; and
    (b) at least one sub-volume chamber directly connected to the main volume chamber,
wherein the resonator main body is configured to have both (i) a Helmholtz-resonator functional part whose resonance frequency is determined based on a total volumetric capacity of the resonator main body, substantially corresponding to a summed value of a volume of the main volume chamber and a volume of the sub-volume chamber, and (ii) a side-branch-resonator functional part whose resonance frequency is determined based on a summed length of a longitudinal length of the sub-volume chamber and a length of a hypothetical extension of the sub-volume chamber, which extension is obtained by hypothetically extending the sub-volume chamber into the main volume chamber in a longitudinal direction of the sub-volume chamber.

2. The resonator as claimed in claim 1, wherein:
the resonator main body is formed into a substantially L-shape by directly connecting only one elongated sub-volume chamber to the main volume chamber; and
the resonator main body is configured, so that the longitudinal direction of the sub-volume chamber is identical to a lateral direction of the vehicle, and that the resonator main body is arranged in close proximity to an air intake of the air intake duct, which air intake opens at a front end of the vehicle in a manner so as to be directed forwardly of the vehicle, and that the sub-volume chamber is arranged along a front end face of the vehicle.

3. The resonator as claimed in claim 2, further comprising:
a dummy air intake having a substantially same outline as the air intake of the air intake duct as viewed from the front end face of the vehicle, and attached to the sub-volume chamber, so that the air intake and the dummy air intake are symmetrical to each other with respect to a reference line that indicates a central position in the lateral direction of the vehicle.

4. The resonator as claimed in claim 1, further comprising:
an additional side-branch resonator connected to the air intake duct, and formed integral with the resonator main body.

5. The resonator as claimed in claim 4, wherein:
the additional side-branch resonator is configured to extend along a lower face of the sub-volume chamber of the resonator main body.

6. A resonator comprising:
a neck portion; and
a resonator main body comprising:
   (a) a main volume chamber communicated with an air intake duct of an internal combustion engine for a vehicle via the neck portion; and
   (b) a plurality of sub-volume chambers directly connected to the main volume chamber,
wherein the number of the sub-volume chambers is an even number to provide a plurality of pairs of sub-volume chambers, central axes of each of the pairs of sub-volume chambers are identical to each other, and longitudinal lengths of the pairs of sub-volume chambers differ from each other, and
wherein the resonator main body is configured to have (i) a Helmholtz-resonator functional part whose resonance frequency is determined based on a total volumetric capacity of the resonator main body, substantially corresponding to a summed value of a volume of the main volume chamber and volumes of the sub-volume chambers, and (ii) a plurality of side-branch-resonator functional parts whose resonance frequencies are determined based on the longitudinal lengths of the respective pairs of sub-volume chambers.

7. A resonator comprising:
a neck portion; and
a resonator main body comprising:
   (a) a main volume chamber communicated with an air intake duct of an internal combustion engine for a vehicle via the neck portion; and
   (b) a plurality of sub-volume chambers directly connected to the main volume chamber,
wherein central axes of the sub-volume chambers are offset from each other and longitudinal lengths of the sub-volume chambers differ from each other, and
wherein the resonator main body is configured to have (i) a Helmholtz-resonator functional part whose resonance frequency is determined based on a total volumetric capacity of the resonator main body, substantially corresponding to a summed value of a volume of the main volume chamber and volumes of the sub-volume chambers, and (ii) a plurality of side-branch-resonator functional parts constructed by the respective sub-volume chambers and hypothetical extensions obtained by hypothetically extending each of the sub-volume chambers into the main volume chamber, a resonance frequency of each of the side-branch-resonator functional parts being determined based on a summed longitudinal length of the associated sub-volume chamber and the associated hypothetical extension.

8. A resonator comprising:
a neck portion; and
a resonator main body comprising:
   (a) a main volume chamber communicated with an air intake duct of an internal combustion engine for a vehicle via the neck portion; and
   (b) a plurality of sub-volume chambers directly connected to the main volume chamber, the plurality of sub-volume chambers comprising:
      (1) at least one pair of sub-volume chambers whose central axes are identical to each other; and
      (2) at least one offset sub-volume chamber whose central axis is offset from a central axis of the other sub-volume chamber,
wherein the resonator main body is configured to have (i) a Helmholtz-resonator functional part whose resonance frequency is determined based on a total volumetric capacity of the resonator main body, substantially corresponding to a summed value of a volume of the main volume chamber and volumes of the sub-volume chambers, (ii) a first side-branch-resonator functional part, which is constructed by the pair of sub-volume chambers whose central axes are identical to each other and whose resonance frequency is determined based on a longitudinal length of the pair of sub-volume chambers, and (iii) a second side-branch-resonator functional part, which is constructed by the offset sub-volume chamber and a hypothetical extension obtained by hypothetically extending the offset sub-volume chamber into the main volume chamber and whose resonance frequency is determined based on a summed longitudinal length of the offset sub-volume chamber and the hypothetical extension.

* * * * *